United States Patent [19]
Regel

[11] Patent Number: 5,934,169
[45] Date of Patent: Aug. 10, 1999

[54] DOUBLE-ACTING ELECTROPNEUMATIC POSITIONER

[75] Inventor: Mathias Regel, Gruendau, Germany

[73] Assignee: Honeywell AG, Offenbach, Germany

[21] Appl. No.: 08/613,790

[22] Filed: Feb. 23, 1996

[30] Foreign Application Priority Data

Feb. 24, 1995 [DE] Germany ............ 195 06 469

[51] Int. Cl.⁶ .................................................. F15B 13/16
[52] U.S. Cl. ........................... 91/361; 91/363 R; 91/420
[58] Field of Search ............... 91/3, 361, 363 R, 91/420

[56] References Cited

U.S. PATENT DOCUMENTS

| | | | |
|---|---|---|---|
| 2,601,511 | 6/1952 | Gaffney | 91/421 |
| 2,624,319 | 1/1953 | Heyer | 91/361 |
| 2,800,913 | 7/1957 | Swartwout et al. | 91/363 R |
| 4,628,499 | 12/1986 | Hammett | 91/361 |
| 4,819,543 | 4/1989 | Leinen | 91/363 R |
| 5,038,670 | 8/1991 | Roe | 91/455 |

FOREIGN PATENT DOCUMENTS 7538863  1/1976  Germany.

OTHER PUBLICATIONS

Honeywell brochure on "Series 2200 Electro–pneumatic positioner", Nov. 1993.

*Primary Examiner*—F. Daniel Lopez
*Attorney, Agent, or Firm*—Anthony Miologos

[57] ABSTRACT

A double-acting electropneumatic positioner for controlling an actuator, the actuator having a first and second chamber, comprises a single-acting electropneumatic positioner which provides an output pneumatic pressure to the first chamber of the actuator. A pressure inverter, coupled to the single-acting electropneumatic positioner, inverts the output pneumatic pressure. The inverted output pneumatic pressure is then coupled to the second chamber of the actuator.

3 Claims, 1 Drawing Sheet ically, to the type of transduces which converts elec-
DOUBLE-ACTING ELECTROPNEUMATIC POSITIONER

BACKGROUND OF THE INVENTION

The present invention is related to transducers, and more particularly, to the type of transduces which converts electrical input signals to a pressure output, i.e., a double-acting electropneumatic positioner.

Electropneumatic positioners are devices which set up a connection between electrical or electronic devices and pneumatic actuators. An input signal representing a command variable is a small load-independent current in the mA range (e.g., 4–20 mA), whereas the regulated quantity (i.e., the output signal) is a controlled air pressure which is used for the actuation of a pneumatic diaphragm or piston actuators.

Electropneumatic positioners commonly operate according to the force-balancing principle. An electrical signal, a load independent current, provided by a controller (or steering device) to the electropneumatic positioner is coverted into a pneumatic signal proportional to the electric signal via a moving coil and a nozzle/baffle plate system, or via a piezo beam which is deflectable by the electrical control signal. This pneumatic signal, after being amplified, serves to control the pneumatic actuator.

With respect to present double-acting electropneumatic positioners, it is common to provide a nozzle/baffle plate system in which two nozzles are acting together with one baffle plate. With an increasing pressure at one nozzle a corresponding decreasing pressure follows at the other nozzle with this pressure being applied to the actuator after being amplified. Such a pneumatic positioner is known from FIG. 1 of German utility Model 75 38 863. With the use of a piezo beam a second inversely controlled piezo beam must be provided.

Besides the increased costs, the known device shows the disadvantage that one of both systems always has an increased air consumption and that due to tolerances of the components used, the dynamic behavior may be different so that the pressure within oppositely arranged chambers of the actuator, in certain cases, can show a behavior which is not strictly counter current.

Thus, there is a need to provide a double-acting electropneumatic positioner having low cost and having essentially ideal, consistent performance characteristics.

SUMMARY OF THE INVENTION

Therefore, there is provided by the present invention a low cost, double-acting electropneumatic positioner having low cost and essentially ideal, consistent performance characteristics. A double acting electropneumatic positioner for controlling an actuator, the actuator having a first and second chamber, comprises a single-acting electropneumatic positioner which provides an output pneumatic pressure to the first chamber of the actuator. A pressure inverter, coupled to the single-acting electropneumatic positioner, inverts the output pneumatic pressure. The inverted output pneumatic pressure is then coupled to the second chamber of the actuator.

The single acting electropneumatic positioner includes a feedback signal which is indicative of the valve stroke. The feedback signal is compared with a command signal to derive a difference signal.

Accordingly, it is an object of the present invention to provide a double-acting electropneumatic positioner with low costs and having essentially ideal consistent performance characteristics.

This and other objects of the present invention will become more apparent when taken in conjunction with the following description and attached drawing, wherein like characters indicate like parts, and which drawing forms a part of the present application.

DETAILED DESCRIPTION

Figure 1:
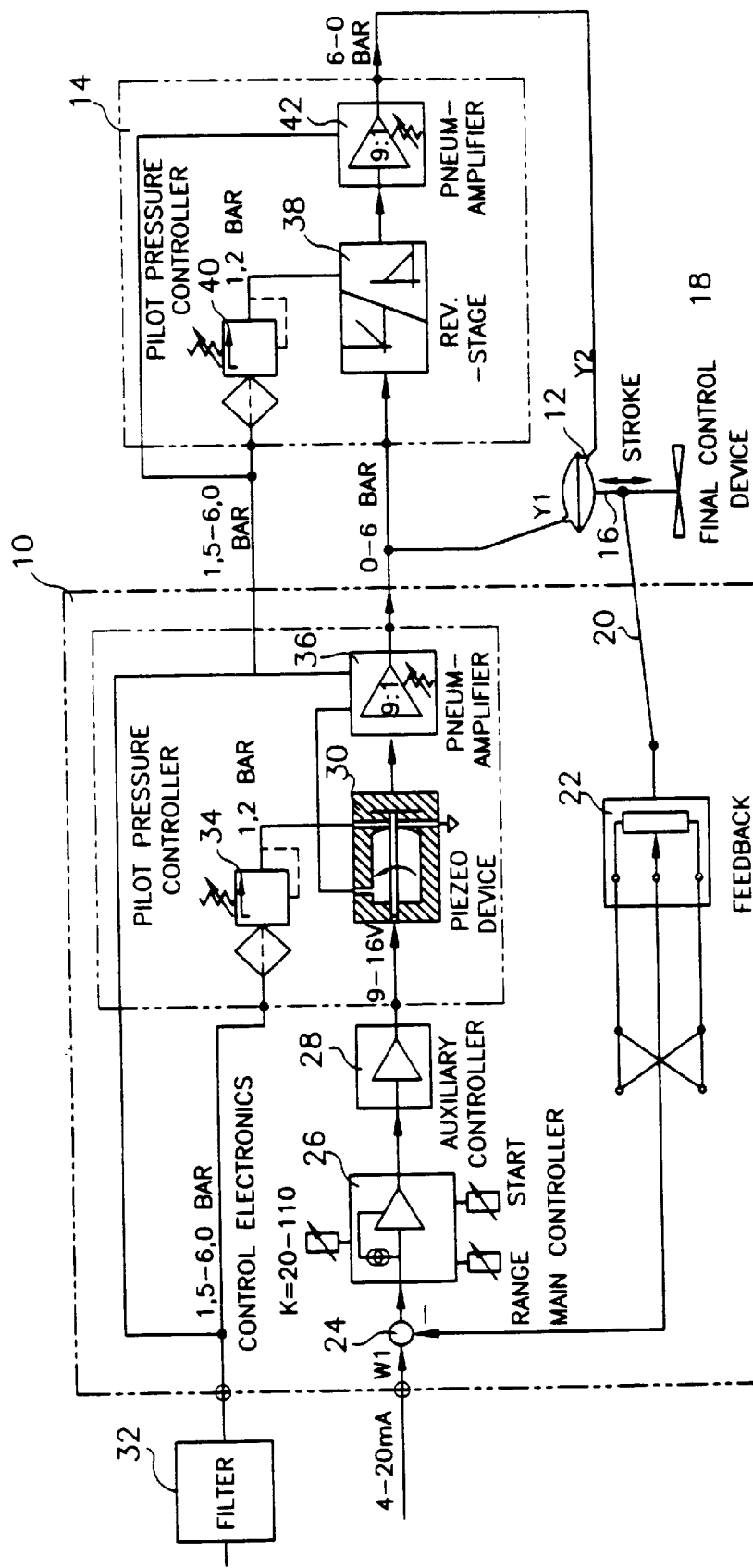
FIG. 1, the sole drawing of the present application, shows a block diagram of the double-acting electropneumatic positioner of the preferred embodiment of the present invention.

Referring to FIG. 1, the sole drawing of the present application, there is shown a functional block diagram of the preferred embodiment of the present invention. An electropneumatic positioner (E/P) 10 is shown which acts upon an upper chamber of a diaphragm actuator 12 having an output pressure $Y_1$. The output pressure $Y_1$, which is ranged between 0 and 6 bar, is additionally applied to a pressure inverter 14, which produces an output pressure $Y_2$ in the range of 6 to 9 bar, i.e., counter current to the input pressure $Y_1$. The output pressure $Y_2$ is fed to a lower chamber of the diaphragm actuator 12. The diaphragm actuator 12 acts upon a closing body (not shown) of a valve 18 via a valve rod 16.

The stroke of the valve rod 16 is tapped via a linkage 20 and is converted into the position by a feedback potentiometer 22. In this manner, the valve stroke is converted into an electrical signal, which is compared with a load-independent current of a command variable (4–20 mA) within a comparison element 24. This difference signal is coupled to a main controller 26, having an adjustable range and proportionality factor, and then coupled to an auxiliary controller 28. The output of the auxiliary controller 28 is coupled to a piezo device 30, such that the difference signal controls the piezo device 30. The piezo device 30 operates as an E/P transducer, converting the electrical control deviation into a pneumatic pressure signal. Thus, a piezo beam is essentially lifted from a nozzle, which is fed with a controlled supply pressure, as a function of the magnitude of the applied electrical signal, whereas at the same time the venting nozzle is closed more and more so that the pressure at the output of the piezo device 30 is increasing.

Supply air with a pressure between 1.5 and 6.0 bar is fed to the E/P transducer 10 via an air filter 32 and is kept at a constant pressure of 1.2 bar by means of a pilot pressure controller 34 arranged within the positioner 10. This controlled pilot pressure of 1.2 bar is fed to the piezo device 30 as an input pressure.

The output pressure of the piezo device 30 is amplified by means of a pneumatic amplifier 36 to 0–6 bar and, as already mentioned, is fed to the diaphragm actuator 12 as the output pressure $Y_1$.

The output pressure $Y_1$ additionally is fed to a reversing stage 38 within a pressure inverter 14. The reversing stage 38 also is supplied via a pilot pressure controller 40 with a controlled pressure of 1.2 bar. The output of the reversing stage 38 is fed to a pneumatic amplifier 42 which outputs an inverted pressure signal of 6–0 bar, which is then coupled to the diaphragm actuator 12 as the inverted output pressure $Y_2$.

The individual pneumatic components utilized in the present invention e.g., air filter, pilot pressure controller, pneumatic amplifier and reversing stage, are all of common design and well understood by those skilled in the art, and will not be discussed further herein. Similarly, the electrical components such as the feedback potentimeter, main controller, auxiliary controller, and the piezo device as an E/P transducer, will not be discussed further herein.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

I claim:

1. A double-acting electromagnetic positioner for controlling an actuator, the actuator having a first and second chamber, and the actuator controlling the position of an actuator arm, comprising:

a) a single-acting electropneumatic positioner which provides an output pneumatic pressure to the first chamber of the actuator; and b) a pressure inverter, including a reversing stage coupled to the single-acting electropneumatic positioner and to a pressure inverter pilot pressure controller and a source of constant pneumatic pressure for inverting the output pneumatic pressure, the pressure inverter further including a pressure inverter pneumatic amplifier coupled to the reversing stage for receiving the inverted output pneumatic pressure, the output of the pressure inverter pneumatic amplifier coupled to the second chamber of the actuator.

2. A double-acting electropneumatic positioner according to claim 1, wherein said single acting electropneumatic positioner comprises:

a) a piezo device coupled to a positioner pilot pressure controller and a source of constant pneumatic pressure which operates as an electropneumatic transducer to generate a pneumatic pressure signal;

b) a feedback element operatively connected to said actuator arm, which generates a feedback signal indicative of the position of the actuator arm;

c) compare element for comparing an input control signal indicative of a desired actuator arm position to the feedback signal; and d) control electronics for generating an electrical signal to the piezo device in response to a difference signal generated by the compare element.

3. A double-acting electropneumatic positioner according to claim 2, wherein said single acting electropneumatic positioner further includes a positioner pneumatic amplifier coupled to the piezo device, the positioner pneumatic amplifier receiving the pneumatic pressure signal whereby the positioner pneumatic amplifier generates and outputs said output pneumatic pressure to the first chamber of the actuator and the pressure inverter.

* * * * *